United States Patent
Zhang et al.

(10) Patent No.: US 11,379,499 B2
(45) Date of Patent: Jul. 5, 2022

(54) METHOD AND APPARATUS FOR EXECUTING DISTRIBUTED COMPUTING TASK

(71) Applicant: BEIJING BAIDU NETCOM SCIENCE AND TECHNOLOGY CO., LTD., Beijing (CN)

(72) Inventors: Yuncong Zhang, Beijing (CN); Xiang Wen, Beijing (CN); Cong Wang, Beijing (CN); Hua Chai, Beijing (CN); Yao Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 178 days.

(21) Appl. No.: 16/293,360

(22) Filed: Mar. 5, 2019

(65) Prior Publication Data

US 2019/0213007 A1 Jul. 11, 2019

Related U.S. Application Data

(63) Continuation of application No. PCT/CN2016/100514, filed on Sep. 28, 2016.

(30) Foreign Application Priority Data

Sep. 6, 2016 (CN) .......................... 201610803934.8

(51) Int. Cl.
G06F 16/27 (2019.01)
(52) U.S. Cl.
CPC .................... *G06F 16/27* (2019.01)

(58) Field of Classification Search
CPC ...................................................... G06F 16/27
See application file for complete search history.

(56) References Cited

U.S. PATENT DOCUMENTS

| 9,965,252 B2 * | 5/2018 | Bera ......................... G06F 8/10 |
| 10,275,736 B1 * | 4/2019 | Annam ................ G06Q 10/087 |

(Continued)

FOREIGN PATENT DOCUMENTS

| CN | 103123652 A | 5/2013 |
| CN | 103425779 A | 12/2013 |

(Continued)

OTHER PUBLICATIONS

International Search Report dated Jun. 8, 2017 for International Application No. PCT/CN2016/100514, 5 pages.

(Continued)

*Primary Examiner* — James Trujillo
*Assistant Examiner* — Michal Bogacki
(74) *Attorney, Agent, or Firm* — Knobbe, Martens, Olson & Bear, LLP

(57) ABSTRACT

A method and apparatus for executing a distributed computing task are provided. The method can include: parsing an expression of the distributed computing task to obtain an operator keyword; and executing, by using an operator corresponding to the operator keyword, the distributed computing task based on an input parameter of the operator, the input parameter of the operator including at least one of: a distributed stored distributed dataset including at least one data element, a distributed stored distributed key-value pair set including at least one key-value pair, and a value of the key-value pair in the distributed key-value pair set being a distributed dataset or a distributed key-value pair set.

19 Claims, 4 Drawing Sheets

(56) References Cited

U.S. PATENT DOCUMENTS

| | | | |
|---|---|---|---|
| 2004/0015473 A1* | 1/2004 | Trappen | G06F 16/289 |
| 2009/0024622 A1 | 1/2009 | Chkodrov et al. | |
| 2009/0055370 A1* | 2/2009 | Dagum | G06F 16/182 |
| 2010/0131543 A1 | 5/2010 | Chkodrov et al. | |
| 2012/0066072 A1* | 3/2012 | Kanigsberg | G06F 16/9535 |
| | | | 705/14.66 |
| 2012/0109935 A1* | 5/2012 | Meijer | G06F 16/2452 |
| | | | 707/713 |
| 2013/0014094 A1 | 1/2013 | Chkodrov et al. | |
| 2015/0088894 A1* | 3/2015 | Czarlinska | G06F 16/243 |
| | | | 707/738 |
| 2016/0026438 A1* | 1/2016 | Wolfram | G06F 16/27 |
| | | | 717/109 |
| 2017/0220651 A1* | 8/2017 | Mathew | G06F 16/248 |
| 2017/0243132 A1* | 8/2017 | Sainani | H04L 41/22 |
| 2017/0289240 A1* | 10/2017 | Ghare | H04L 67/10 |
| 2018/0032861 A1* | 2/2018 | Oliner | G06F 40/274 |

FOREIGN PATENT DOCUMENTS

| | | |
|---|---|---|
| CN | 104123288 A | 10/2014 |
| CN | 106406985 A | 2/2017 |
| JP | 2016504679 A | 2/2016 |

OTHER PUBLICATIONS

Written Opinion of the International Searching Authority dated Jun. 8, 2017 for International Application No. PCT/CN2016/100514, 3 pages.
Li, Wenyang, Research on Apache Spark for Big Data Processing, Modern Computer, 2015, pp. 55-59 (with English abstract).
Apache Spark, High Performance Computing Symposium (2016).
Apache Spark, NTT Data Corporation (2015).
Morishima, Shin, et al. "Performance Evaluations of Document-Oriented Databases Using GPU and Cache Structure." IEICE Technical Report (2016).
Spark Programming Guide—Spark 1.0.0 Documentation, retrieved from http://spark.apache.org/docs/1.0.0/programming-guide.html (2018).
Help with collections-key/value pair with multiple values for the same key, Developer Network, downloaded on Aug. 12, 2020, 6 pages.
Zaharia, Apache Spark, "https://en.wikipedia.org/w/index.php?title_Apache_Spark&oldid+737123879," May 30, 2014, 4 pages.
Class DataFrameWriter, http://web.archive.org/web/20151226104319/https://spark.apache.
Anonymous: "Query Documents", Aug. 19, 2016, XP055829903, retrieved from the Internet: URL: https://web.archive.org/web/20160819165040if_/https://docs.mongodb.com/manual/tutorial/query-documents/.
European Office Action dated Aug. 9, 2021 for European Patent Application No. 16915544.7. 7 pages.

* cited by examiner

METHOD AND APPARATUS FOR EXECUTING DISTRIBUTED COMPUTING TASK

CROSS-REFERENCE TO RELATED APPLICATIONS

This application is a continuation of International Application No. PCT/CN2016/100514, filed on Sep. 28, 2016, which claims the priority from Chinese Patent Application No. 201610803934.8, filed with the China National Intellectual Property Administration (CNIPA) on Sep. 6, 2016. The disclosure of each of the aforementioned applications is hereby incorporated by reference in its entirety.

TECHNICAL FIELD

The present disclosure relates to the field of computer, specifically to the field of distributed computing, and more specifically to a method and apparatus for executing a distributed computing task.

BACKGROUND

In developing distributed computing programs, users (such as engineers writing distributed computing programs) may use interfaces provided by distributed computing frameworks to write the distributed computing programs.

The interfaces provided by the existing distributed computing frameworks mainly include three types: native interfaces (e.g., the programming model MapReduce for parallel operations of large-scale datasets), structured query language like (SQL-Like) interfaces (e.g., the data warehouse infrastructure Hive built on the distributed system infrastructure Hadoop developed by the Apache foundation) and resilient distributed datasets (RDD) interfaces (e.g., the open source cluster computing environment Spark, developed by the University of California, Berkeley AMP (Algorithms Machines and People) lab for constructing large, low-latency data analysis applications). The native interface configures and splices multiple different types of operators into a directed acyclic graph to express a complete distributed computing requirement. The SQL-Like interface uses the SQL (structured query language) form to express a distributed computing requirement, abstracts data into tables, and converts each distributed computing requirement into a SQL search. The RDD interface is data-centric, and the entire computing requirement is described as a process of converting a distributed dataset to generate a new distributed dataset and continuing to perform conversion until the final distributed dataset desired is generated.

However, the existing distributed computing frameworks generally have the problem of inconvenient interfaces, especially lack the concept of nested datasets, which leads to the problem that many logics are expressed in a complex way (especially for the expression of grouping logic) and codes are difficult to be reused. Take the SQL-Like interface as an example. Due to the lack of the concept of nested datasets in the SQL-Like interface, some computing requirements cannot be described. Take a common computing requirement as an example: grouping data according to a certain field, and taking the first 10 records with the largest value of the grouping field on each group. When the expression is "select field_1, field_2 from table_1 group by field1 order by field_2 desc limit 10", the first 10 records are actually taken from all groups, instead of taking the first 10 records from each group. When the expression is "select field_1, field_2 from table_1 group by field1 limit 10 order by field_2 desc," the expression does not conform to the SQL syntax, which causes the SQL-Like interface to fail to describe some common computing requirements.

SUMMARY

The objective of the present disclosure includes providing a method and apparatus for executing a distributed computing task, to solve the technical problems mentioned in the Background section.

In a first aspect, the present disclosure provides a method for executing a distributed computing task, including: parsing an expression of the distributed computing task to obtain an operator keyword, the operator keyword including at least one of the following: a grouping operator keyword, an operation operator keyword, a traversal operator keyword, a value acquisition operator keyword, a key-value pair acquisition operator keyword, a file reading operator keyword, a memory reading operator keyword, a file writing operator keyword, and a memory writing operator keyword; and executing, by using an operator corresponding to the operator keyword, the distributed computing task based on an input parameter of the operator, the input parameter of the operator including at least one of the following: a distributively stored distributed dataset including at least one data element, a distributively stored distributed key-value pair set including at least one key-value pair, and a value of the key-value pair in the distributed key-value pair set being a distributed dataset or a distributed key-value pair set.

In a second aspect, the present disclosure provides an apparatus for executing a distributed computing task, including: an expression-parsing unit, configured to parse an expression of the distributed computing task to obtain an operator keyword, the operator keyword including at least one of the following: a grouping operator keyword, an operation operator keyword, a traversal operator keyword, a value acquisition operator keyword, a key-value pair acquisition operator keyword, a file reading operator keyword, a memory reading operator keyword, a file writing operator keyword, and a memory writing operator keyword; and an execution unit, configured to execute, by using an operator corresponding to the operator keyword, the distributed computing task based on an input parameter of the operator, the input parameter of the operator including at least one of the following: a distributively stored distributed dataset including at least one data element, and a distributively stored distributed key-value pair set including at least one key-value pair, a value of the key-value pair in the distributed key-value pair set being a distributed dataset or a distributed key-value pair set.

The method and apparatus for executing a distributed computing task provided by the present disclosure parses an expression of the distributed computing task to obtain an operator keyword, and execute, by using an operator corresponding to the operator keyword, the distributed computing task based on an input parameter of the operator, the input parameter of the operator including at least one of the following: a distributively stored distributed dataset including at least one data element, a distributively stored distributed key-value pair set including at least one key-value pair, and a value of the key-value pair in the distributed key-value pair set being a distributed dataset or a distributed key-value pair set. The method and apparatus implements operations on nested datasets, so that the operator may act on the distributed dataset or on a distributed dataset corresponding to the value of each key-value pair in the distributed key-value pair set obtained by grouping the distributed dataset, thereby supporting distributed computing tasks having operations on distributed datasets and grouped data by grouping the distributed datasets, enabling code reusability.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
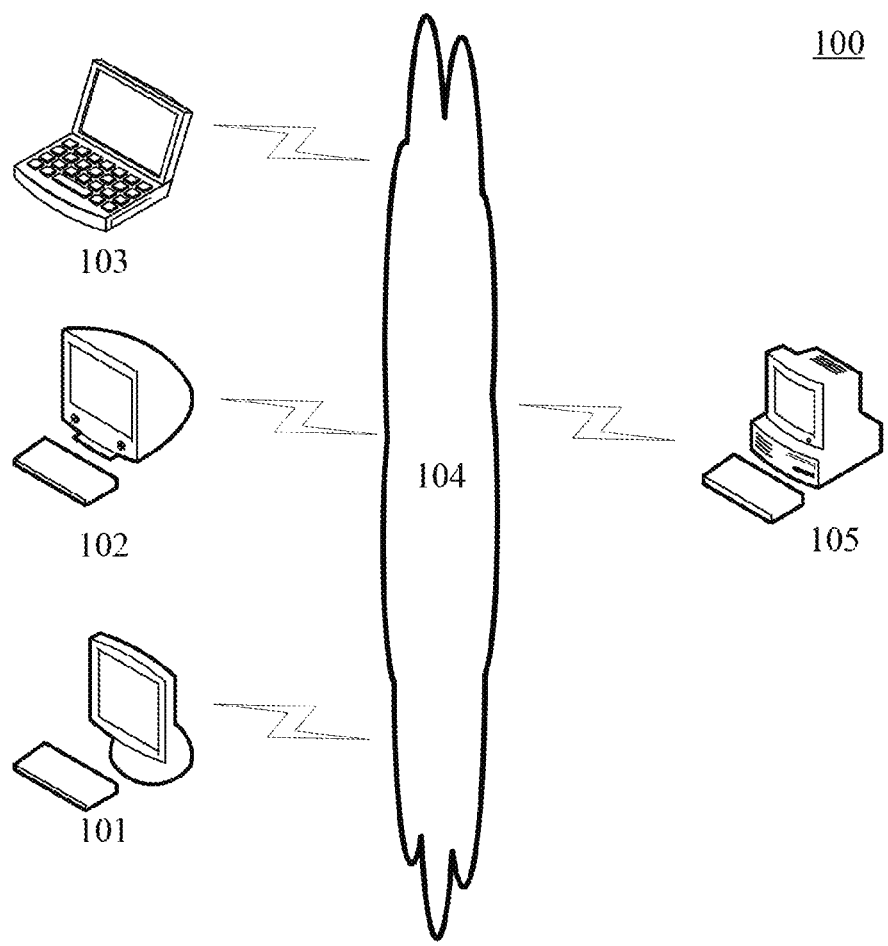
FIG. 1 is an exemplary system architecture diagram to which the present disclosure may be applied.

FIG. 1 illustrates an exemplary system architecture 100 in which a method and apparatus for executing a distributed computing task according to embodiments of the present disclosure may be applied.

As shown in FIG. 1, the system architecture 100 may include distributed computing devices 101, 102, 103, 105 and a network 104. The network 104 serves as a medium providing a communication link between the distributed computing devices 101, 102, 103 and 105. The network 104 may include various types of connections, such as wired or wireless transmission links, or optical cables.

The user may interact with other distributed computing devices through the network 104 using any of the distributed computing devices 101, 102, 103 and 105, in order to receive or send messages, etc. Various client applications, such as distributed computing applications and database applications may be installed on the distributed computing devices 101, 102, 103 and 105.

The distributed computing devices 101, 102, 103, 105 may be various electronic devices having processors and providing distributed computing services, including but not limited to laptop portable computers and desktop computers, and the like. For example, the distributed computing device 105 may assign distributed computing tasks performed thereon to the distributed computing devices 101, 102, 103 to execute a part of the computing tasks, respectively, receive computing results returned from the distributed devices 101, 102, 103, respectively, and gather the results received. The distributed computing devices 101, 102, 103, 105 may also store various data required for the distributed computing tasks.

It should be noted that the method for executing a distributed computing task according to the embodiments of the present disclosure may be performed by any one of the distributed computing devices 101, 102, 103, 105, and correspondingly, the apparatus for executing a distributed computing task may be disposed in any one of the distributed computing devices 101, 102, 103, 105.

It should be appreciated that the numbers of the distributed computing devices and the networks in FIG. 1 are merely illustrative. Any number of distributed computing devices and networks may be provided based on the actual requirements.

Figure 2:
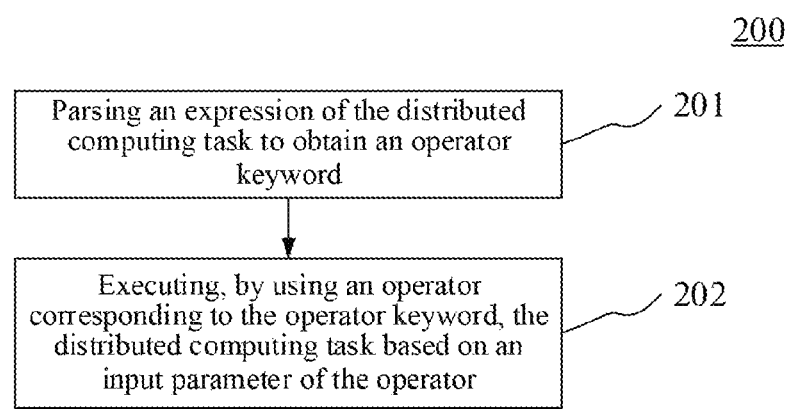
FIG. 2 is a flowchart of an embodiment of a method for executing a distributed computing task according to the present disclosure.

With further reference to FIG. 2, a flow 200 of an embodiment of the method for executing a distributed computing task according to the present disclosure is illustrated. The method for executing a distributed computing task includes the following steps.

Step 201, parsing an expression of the distributed computing task to obtain an operator keyword.

In the present embodiment, the electronic device (e.g., the distributed computing device as shown in FIG. 1) on which the method for executing a distributed computing task is performed may parse the expression of the distributed computing task to obtain the operator keyword.

In the present embodiment, the operator keyword may include at least one of the following: a grouping operator keyword, an operation operator keyword, a traversal operator keyword, a value acquisition operator keyword, a key-value pair acquisition operator keyword, a file reading operator keyword, a memory reading operator keyword, a file writing operator keyword, and a memory writing operator keyword.

In the present embodiment, the distributed computing task is to split a big computing task into a plurality of small computing tasks and distribute the small computing tasks to different computers for execution, and then gather the results of executing the small tasks by the computers. Generally, distributed computing tasks are represented by expressions (that is, codes written by interfaces provided by distributed computing frameworks). Operator keywords may be included in the expressions of the distributed computing tasks. For example, the operator keyword may be a function name in an interface provided by a distributed computing framework. Each operator keyword has a corresponding operator, which represents the operation on the data. For example, the operator may be a function in the interface provided by the distributed computing framework. As an example, the grouping operator corresponding to the grouping operator keyword "group_by" may implement a grouping operation on the distributed dataset operated by the grouping operator. The operation operator corresponding to the operation operator keyword "count" may implement a counting operation on the number of elements in the distributed dataset on which the operation operator keyword "count" acts. The operation operator corresponding to the operation operator keyword "kmeans" may implement a K-means clustering operation on the distributed dataset on which the operation operator keyword "kmeans" acts.

Step 202, executing, by using an operator corresponding to the operator keyword, the distributed computing task based on an input parameter of the operator.

In the present embodiment, based on the operator keyword obtained in step 201, the electronic device may execute, by using the operator corresponding to the operator keyword, the distributed computing task based on the input parameter of the operator. Since the operator represents the operation on the data, the input parameter of the operator is the data to be operated by the operator.

In the present embodiment, the input parameter of the operator may include at least one of: a distributed dataset being stored distributively and including at least one data element, a distributed key-value pair set being stored distributively and including at least one key-value pair. The value of the key-value pair in the distributed key-value pair set is a distributed dataset or a distributed key-value pair set.

In the present embodiment, the data element may be any data type that can be serialized, such as an integer, a floating-point type, a character string. The distributed dataset may be a set of data elements that are distributed stored in at least one computer. There is no sequential relationship between the data elements in the distributed dataset, and the data types may be different. The values of different data elements in the distributed dataset may be the same (i.e., the data elements of the distributed dataset may be repeated). A distributed dataset with only one data element is a data element and also a special distributed dataset. There is no sequential relationship between key-value pairs in a distributed key-value pair set. The elements of different key-value pairs in the distributed key-value pair set may be the same (i.e., the key-value pairs of the distributed key-value pair set may be repeated). The value in the distributed key-value pair may be the distributed dataset or the distributed key-value pair set.

In some alternative implementations of the present embodiment, the operator corresponding to the operator keyword may also be used to execute the distributed computing task based on the input parameter and the output parameter of the operator. In addition to operating on the input parameter of the operator, the operator may also return the result of the operation on the input parameter of the operator to the output parameter of the operator. The output parameter of the operator may be a distributed dataset or a distributed key-value pair set.

For example, in the present embodiment, the distributed dataset is represented by PCollection, the distributed dataset having only one data element is represented by PObject, and the distributed key-value pair set is represented by PTable.

In some alternative implementations of the present embodiment, the parsing an expression of the distributed computing task to obtain an operator keyword may include: parsing the expression of the distributed computing task to obtain the grouping operator keyword, a grouped distributed dataset keyword for representing a distributed dataset operated by the grouping operator corresponding to the grouping operator keyword, and a grouping condition keyword for representing a grouping basis of grouping the distributed dataset represented by the grouped distributed dataset keyword, and the executing, by using an operator corresponding to the operator keyword, the distributed computing task based on an input parameter of the operator may include: grouping the distributed dataset represented by the grouped distributed dataset keyword according to the grouping condition keyword to obtain grouped data, and using the grouping condition keyword and the grouped data to form a key-value pair to obtain a distributed key-value pair set.

For example, for a distributed dataset pollection including data elements [1, 2, 3, 4, 5, 6], executing the distributed computing task corresponding to the expression "pcollection.group_by (lambda num: num % 3);" includes: first, parsing the expression to obtain the grouping operator keyword "group_by", the grouped distributed dataset keyword "pcollection", and the grouping condition keyword "lambda num: num % 3"; then, grouping the distributed dataset "[1, 2, 3, 4, 5, 6]" represented by the grouped distributed dataset keyword "pcollection" according to the grouping condition keyword "lambda num: num % 3" (i.e., divided by 3 to acquire remainder) to obtain grouped data [3, 6], [1, 4] and [2, 5], and using the grouping condition keyword and the grouped data to form key-value pairs to obtain a distributed key-value pair set: {0: [3, 6], 1: [1, 4], 2: [2, 5]}.

In some alternative implementations of the present embodiment, the parsing an expression of the distributed computing task to obtain an operator keyword may include: parsing the expression of the distributed computing task to obtain the operation operator keyword, an operated distributed dataset keyword for representing a distributed dataset operated by an operation operator corresponding to the operation operator keyword, and a return distributed dataset keyword for representing a distributed dataset returned after performing an operation corresponding to the operation operator keyword on the distributed dataset represented by the operated distributed dataset keyword; and the executing, by using an operator corresponding to the operator keyword, the distributed computing task based on an input parameter of the operator may include: performing the operation corresponding to the operation operator keyword on the distributed dataset represented by the operated distributed dataset keyword and returning a new distributed dataset, and determining the new distributed dataset as the distributed dataset represented by the return distributed dataset keyword.

For example, executing the distributed computing task corresponding to the expression "pcollection_2=pcollection_1.map(lambda num: num*2);" includes: first, parsing the expression to obtain the operation operator keyword "map(lambda num: num*2);", the operated distributed dataset keyword "pcollection_1" and the return distributed dataset keyword "pcollection_2"; then, performing the operation (i.e., multiply each data element in the distributed dataset pcollection_1 by 2) corresponding to the operation operator keyword "map(lambda num: num*2);" on the distributed dataset pcollection_1 represented by the operated distributed dataset keyword "pcollection_1", and returning the result of the operation as a new distributed dataset, and determining the returned new distributed dataset as the distributed dataset pcollection_2 represented by the return distributed dataset keyword "pcollection_2".

As another example, executing the distributed computing task corresponding to the expression "pcollection_2=pcollection_1.count( );" includes: first, parsing the expression to obtain the operation operator keyword "count( )", the operated distributed dataset keyword "pcollection_1" and the return distributed dataset keyword "pcollection_2"; then, performing the operation (i.e., count the number of data elements in the distributed dataset pcollection_1) corresponding to the operation operator keyword "count( )" on the distributed dataset pcollection_1 represented by the operated distributed dataset keyword "pcollection_1", and returning the result of the operation (i.e., the counting result) as a new distributed dataset, and determining the new distributed dataset as the distributed dataset pcollection_2 represented by the return distributed dataset keyword "pcollection_2". Here, it should be noted that "pcollection_2" is a special distributed dataset with only one data element, and the value of the data element is the number of data elements in pcollection_1.

In some alternative implementations of the present embodiment, the parsing an expression of the distributed computing task to obtain an operator keyword may include: parsing the expression of the distributed computing task to obtain a traversal operator keyword, a traversed distributed key-value pair set keyword for representing a distributed key-value pair set operated by a traversal operator corresponding to the traversal operator keyword, and a traversed operator keyword for representing an operator operated by the traversal operator corresponding to the traversal operator keyword; and the executing, by using an operator corresponding to the operator keyword, the distributed computing task based on an input parameter of the operator may include: performing an operation corresponding to the traversed operator keyword on a distributed dataset corresponding to a value in each key-value pair in the distributed key-value pair set represented by the traversed distributed key-value pair set keyword.

For example, executing the distributed computing task corresponding to the expression "ptable.apply_values (count_distinct);" includes: first, parsing the expression to obtain the traversal operator keyword "apply_values", the traversed distributed key-value pair set keyword "ptable", and the traversed operator keyword "count_distinct"; then, performing the operation (i.e., counting the number of non-repeating data elements in the distributed dataset) corresponding to the traversed operator keyword "count_distinct" on a distributed dataset corresponding to the value in each key-value pair in the distributed key-value pair set ptable represented by the traversed distributed key-value pair set keyword "ptable".

In some alternative implementations of the present embodiment, the parsing an expression of the distributed computing task to obtain an operator keyword may include: parsing the expression of the distributed computing task to obtain a value acquisition operator keyword, a value-supplying distributed key-value pair set keyword for representing a distributed key-value pair set operated by a value acquisition operator corresponding to the value acquisition operator keyword, and a value acquisition distributed dataset keyword for representing a distributed dataset returned after performing an operation corresponding to the value acquisition operator keyword on the distributed key-value pair set represented by the value-supplying distributed key-value pair set keyword; and the executing, by using an operator corresponding to the operator keyword, the distributed computing task based on an input parameter of the operator may include: adding a value in each key-value pair in the distributed key-value pair set represented by the value-supplying distributed key-value pair set keyword as a data element to the distributed dataset represented by the value acquisition distributed dataset keyword.

For example, for a distributed key-value pair set ptable with elements of {0:[3,6], 1:[1,4], 2:[2,5]}, executing the distributed computing task corresponding to the expression "pcollection=ptable. flatten_values ( );" includes: first, parsing the expression to obtain the value acquisition operator keyword "flatten_values", the value-supplying distributed key-value pair set keyword "ptable", and the value acquisition distributed dataset keyword "pcollection"; then, adding the value in each key-value pair in the distributed key-value pair set represented by the value-supplying distributed key-value pair set keyword "ptable" as a data element to the distributed dataset pcollection represented by the value acquisition distributed dataset keyword "pcollection". The value of the acquired pcollection is [1, 2, 3, 4, 5, 6].

In some alternative implementations of the present embodiment, the parsing an expression of the distributed computing task to obtain an operator keyword may include: parsing the expression of the distributed computing task to obtain the key-value pair acquisition operator keyword, a key-value pair supplying distributed key-value pair set keyword for representing a distributed key-value pair set operated by a key-value pair acquisition operator corresponding to the key-value pair acquisition operator keyword, and a key-value pair acquisition distributed dataset keyword for representing a distributed dataset returned after performing an operation corresponding to the key-value pair acquisition operator keyword on the distributed key-value pair set represented by the key-value pair supplying distributed key-value pair set keyword; and the executing, by using an operator corresponding to the operator keyword, the distributed computing task based on an input parameter of the operator may include: combining, for a key-value pair having a value being a distributed dataset in key-value pairs in the distributed key-value pair set represented by the key-value pair supplying distributed key-value pair set keyword, data elements in the distributed dataset being the value with the key in the key-value pair respectively to form new key-value pairs, and adding the formed new key-value pairs as data elements to the distributed dataset represented by the key-value pair acquisition distributed dataset keyword.

For example, for a distributed key-value pair set ptable with elements of {0:[3,6], 1:[1,4], 2:[2,5]}, executing the distributed computing task corresponding to the expression "pcollection=ptable. flatten ( );" includes: first, parsing the expression to obtain the key-value pair acquisition operator keyword "flatten", the key-value pair supplying distributed key-value pair set keyword "ptable", and the key-value pair acquisition distributed dataset keyword "pcollection"; then, combining, for a key-value pair having a value being a distributed dataset in key-value pairs in the distributed key-value pair set ptable represented by the key-value pair supplying distributed key-value pair set keyword "ptable", data elements in the distributed dataset being the value with the key in the key-value pair respectively to form new key-value pairs, and adding the formed new key-value pairs as data elements to the distributed dataset pcollection represented by the key-value pair acquisition distributed dataset keyword "pcollection". The acquired pcollection is: [0:3,0: 6, 1:1, 1:4, 2:2, 2:5], which includes six data elements each being a key-value pair.

In some alternative implementations of the present embodiment, the parsing an expression of the distributed computing task to obtain an operator keyword may include: parsing the expression of the distributed computing task to obtain a file reading operator keyword, a file reading distributed dataset keyword for representing a distributed dataset operated by a file reading operator corresponding to the file reading operator keyword, and a file reading storage path for representing a file operated by the file reading operator; and the executing, by using an operator corresponding to the operator keyword, the distributed computing task based on an input parameter of the operator may include: writing data in the file represented by the file reading storage path to the distributed dataset represented by the file reading distributed dataset keyword.

For example, executing the distributed computing task corresponding to the expression "pcollection=pipeline.read (From.TextFile ('hdfs:///input.txt'));" includes: first, parsing the expression to obtain the file reading operator keyword "pipeline.read (From.TextFile", the file reading distributed dataset keyword "pcollection", and the file reading storage path "hdfs:///input.txt"; then, writing data in the file input.txt represented by the file reading storage path "hdfs:///input.txt" to the distributed dataset pcollection represented by the file reading distributed dataset keyword "pcollection".

In some alternative implementations of the present embodiment, the parsing an expression of the distributed computing task to obtain an operator keyword may include: parsing the expression of the distributed computing task to obtain a memory reading operator keyword, a memory reading distributed dataset keyword for representing a distributed dataset operated by a memory reading operator, and a memory reading address keyword for representing a memory operated by the memory reading operator; and the executing, by using an operator corresponding to the operator keyword, the distributed computing task based on an input parameter of the operator may include: writing data in the memory represented by the memory reading address keyword to the distributed dataset represented by the memory reading distributed dataset keyword.

For example, executing the distributed computing task corresponding to the expression "pcollection=pipeline.parallelize ([1, 2, 3]);" includes: first, parsing the expression to obtain the memory reading operator keyword "pipeline.parallelize", the memory reading distributed dataset keyword "pcollection", and the memory reading address keyword "[1, 2, 3]"; then, writing data [1, 2, 3] in the memory represented by the memory reading address keyword "[1, 2, 3]" to the distributed dataset pcollection represented by the memory reading distributed dataset keyword "pcollection".

In some alternative implementations of the present embodiment, the parsing an expression of the distributed computing task to obtain an operator keyword may include: parsing the expression of the distributed computing task to obtain the file writing operator keyword, a file writing distributed dataset keyword for representing a distributed dataset operated by a file writing operator, and a file writing storage path for representing a file operated by the file writing operator; and the executing, by using an operator corresponding to the operator keyword, the distributed computing task based on an input parameter of the operator may include: writing data in the distributed dataset represented by the file writing distributed dataset keyword to the file represented by the file writing storage path.

For example, executing the distributed computing task corresponding to the expression "pipeline.write(pcollection, To.SequenceFile('hdfs:///output.txt'));" includes: first, parsing the expression to obtain the file writing operator keyword "pipeline.write", the file writing distributed dataset keyword "pcollection", and the file writing storage path "hdfs:///output.txt"; then, writing data in the distributed dataset represented by the file writing distributed dataset keyword "pcollection" to the file output.txt represented by the file writing storage path "hdfs:///output.txt".

In some alternative implementations of the present embodiment, the parsing an expression of the distributed computing task to obtain an operator keyword may include: parsing the expression of the distributed computing task to obtain the memory writing operator keyword, a memory writing distributed dataset keyword for representing a distributed dataset operated by a memory writing operator, and a memory writing address keyword for representing a memory operated by the memory writing operator; and the executing, by using an operator corresponding to the operator keyword, the distributed computing task based on an input parameter of the operator may include: writing data in the distributed dataset represented by the memory writing distributed dataset keyword to the memory represented by the memory writing address keyword.

For example, executing the distributed computing task corresponding to the expression "a_list=pcollection.get( );" includes: first, parsing the expression to obtain the memory writing operator keyword "get( )", the memory writing distributed dataset keyword "pcollection", and the memory writing address keyword "a_list"; then, writing data in the distributed dataset pcollection represented by the memory writing distributed dataset keyword "pcollection" to the memory represented by the memory writing address keyword "a_list".

The method for executing a distributed computing task provided by the embodiments of the present disclosure parses an expression of the distributed computing task to obtain an operator keyword, and execute, by using an operator corresponding to the operator keyword, the distributed computing task based on an input parameter of the operator. The method implements operations on nested datasets, so that the operator may act on the distributed dataset or on a distributed dataset corresponding to the value of each key-value pair in the distributed key-value pair set obtained by grouping the distributed dataset, thereby supporting distributed computing tasks having operations on data such as distributed datasets and grouped data by grouping the distributed datasets, enabling code reusability.

Figure 3:
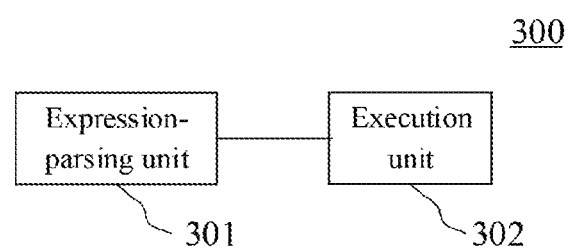
FIG. 3 is a schematic structural diagram of an embodiment of an apparatus for executing a distributed computing task according to the present disclosure.

With further reference to FIG. 3, as an implementation to the method shown in the above figures, the present disclosure provides an embodiment of an apparatus for executing a distributed computing task. The apparatus embodiment corresponds to the method embodiment shown in FIG. 2, and the apparatus may specifically be applied to various electronic devices.

As shown in FIG. 3, the apparatus 300 for executing a distributed computing task of the present embodiment includes: an expression-parsing unit 301 and an execution unit 302. Here, the expression-parsing unit 301 is configured to parse an expression of the distributed computing task to obtain an operator keyword, the operator keyword including at least one of the following: a grouping operator keyword, an operation operator keyword, a traversal operator keyword, a value acquisition operator keyword, a key-value pair acquisition operator keyword, a file reading operator keyword, a memory reading operator keyword, a file writing operator keyword, and a memory writing operator keyword. The execution unit 302 is configured to execute, by using an operator corresponding to the operator keyword, the distributed computing task based on an input parameter of the operator, the input parameter of the operator including at least one of the following: a distributively stored distributed dataset including at least one data element, a distributively stored distributed key-value pair set including at least one key-value pair, and a value of the key-value pair in the distributed key-value pair set being a distributed dataset or a distributed key-value pair set.

In the present embodiment, the specific processing of the expression-parsing unit 301 and the execution unit 302 of the apparatus 300 for executing a distributed computing task and the technical effects thereof may be referred to the related descriptions of step 201 and step 202 in the corresponding embodiment of FIG. 2, respectively, and detailed description thereof will be omitted.

In some alternative implementations of the present embodiment, the expression-parsing unit 301 may be further configured to: parse the expression of the distributed computing task to obtain the grouping operator keyword, a grouped distributed dataset keyword for representing a distributed dataset operated by a grouping operator corresponding to the grouping operator keyword, and a grouping condition keyword for representing a grouping basis for grouping the distributed dataset represented by the grouped distributed dataset keyword; and the execution unit 302 may be further configured to: group the distributed dataset represented by the grouped distributed dataset keyword according to the grouping condition keyword to obtain grouped data, and combine the grouping condition keyword and the grouped data into a key-value pair to obtain a distributed key-value pair set.

In some alternative implementations of the present embodiment, the expression-parsing unit 301 may be further configured to: parse the expression of the distributed computing task to obtain the operation operator keyword, an operated distributed dataset keyword for representing a distributed dataset operated by an operation operator corresponding to the operation operator keyword, and a return distributed dataset keyword for representing a distributed dataset returned after performing an operation corresponding to the operation operator keyword on the distributed dataset represented by the operated distributed dataset keyword; and the execution unit may be further configured to: perform the operation corresponding to the operation operator keyword on the distributed dataset represented by the operated distributed dataset keyword and return a new distributed dataset, and determine the new distributed dataset as the distributed dataset represented by the return distributed dataset keyword.

In some alternative implementations of the present embodiment, the expression-parsing unit 301 may be further configured to: parse the expression of the distributed computing task to obtain the traversal operator keyword, a traversed distributed key-value pair set keyword for representing a distributed key-value pair set operated by a traversal operator corresponding to the traversal operator keyword, and a traversed operator keyword for representing an operator operated by the traversal operator corresponding to the traversal operator keyword; and the execution unit 302 may be further configured to: perform an operation corresponding to the traversed operator keyword on distributed datasets corresponding to values in key-value pairs in the distributed key-value pair set represented by the traversed distributed key-value pair set keyword.

In some alternative implementations of the present embodiment, the expression-parsing unit 301 may be further configured to: parse the expression of the distributed computing task to obtain the value acquisition operator keyword, a value-supplying distributed key-value pair set keyword for representing a distributed key-value pair set operated by a value acquisition operator corresponding to the value acquisition operator keyword acts, and a value acquisition distributed dataset keyword for representing a distributed dataset returned after performing an operation corresponding to the value acquisition operator keyword on the distributed key-value pair set represented by the value-supplying distributed key-value pair set keyword; and the execution unit 302 may be further configured to: add values in key-value pairs in the distributed key-value pair set represented by the value-supplying distributed key-value pair set keyword as data elements to the distributed dataset represented by the value acquisition distributed dataset keyword.

In some alternative implementations of the present embodiment, the expression-parsing unit 301 may be further configured to: parse the expression of the distributed computing task to obtain the key-value pair acquisition operator keyword, a key-value pair supplying distributed key-value pair set keyword for representing a distributed key-value pair set operated by a key-value pair acquisition operator corresponding to the key-value pair acquisition operator keyword, and a key-value pair acquisition distributed dataset keyword for representing a distributed dataset returned after performing an operation corresponding to the key-value pair acquisition operator keyword on the distributed key-value pair set represented by the key-value pair supplying distributed key-value pair set keyword; and the execution unit 302 may be further configured to: combine, for a key-value pair having a value being a distributed dataset in key-value pairs in the distributed key-value pair set represented by the key-value pair supplying distributed key-value pair set keyword, data elements in the distributed dataset being the value with the key in the key-value pair respectively to form new key-value pairs, and add the formed new key-value pairs as data elements to the distributed dataset represented by the key-value pair acquisition distributed dataset keyword.

In some alternative implementations of the present embodiment, the expression-parsing unit 301 may be further configured to: parse the expression of the distributed computing task to obtain a file reading operator keyword, a file reading distributed dataset keyword for representing a distributed dataset operated by a file reading operator corresponding to the file reading operator keyword, and a file reading storage path for representing a file operated by the file reading operator; and the execution unit 302 may be further configured to: write data in the file represented by the file reading storage path to the distributed dataset represented by the file reading distributed dataset keyword.

In some alternative implementations of the present embodiment, the expression-parsing unit 301 may be further configured to: parse the expression of the distributed computing task to obtain a memory reading operator keyword, a memory reading distributed dataset keyword for representing a distributed dataset operated by a memory reading operator, and a memory reading address keyword for representing a memory operated by the memory reading operator; and the execution unit 302 may be further configured to: write data in the memory represented by the memory reading address keyword to the distributed dataset represented by the memory reading distributed dataset keyword.

In some alternative implementations of the present embodiment, the expression-parsing unit 301 may be further configured to: parse the expression of the distributed computing task to obtain the file writing operator keyword, a file writing distributed dataset keyword for representing a distributed dataset operated by a file writing operator, and a file writing storage path for representing a file operated by the file writing operator; and the execution unit 302 may be further configured to: write data in the distributed dataset represented by the file writing distributed dataset keyword to the file represented by the file writing storage path.

In some alternative implementations of the present embodiment, the expression-parsing unit 301 may be further configured to: parse the expression of the distributed computing task to obtain the memory writing operator keyword, a memory writing distributed dataset keyword for representing a distributed dataset operated by a memory writing operator, and a memory writing address keyword for representing a memory operated by the memory writing operator; and the execution unit 302 may be further configured to: write data in the distributed dataset represented by the memory writing distributed dataset keyword to the memory represented by the memory writing address keyword.

Figure 4:
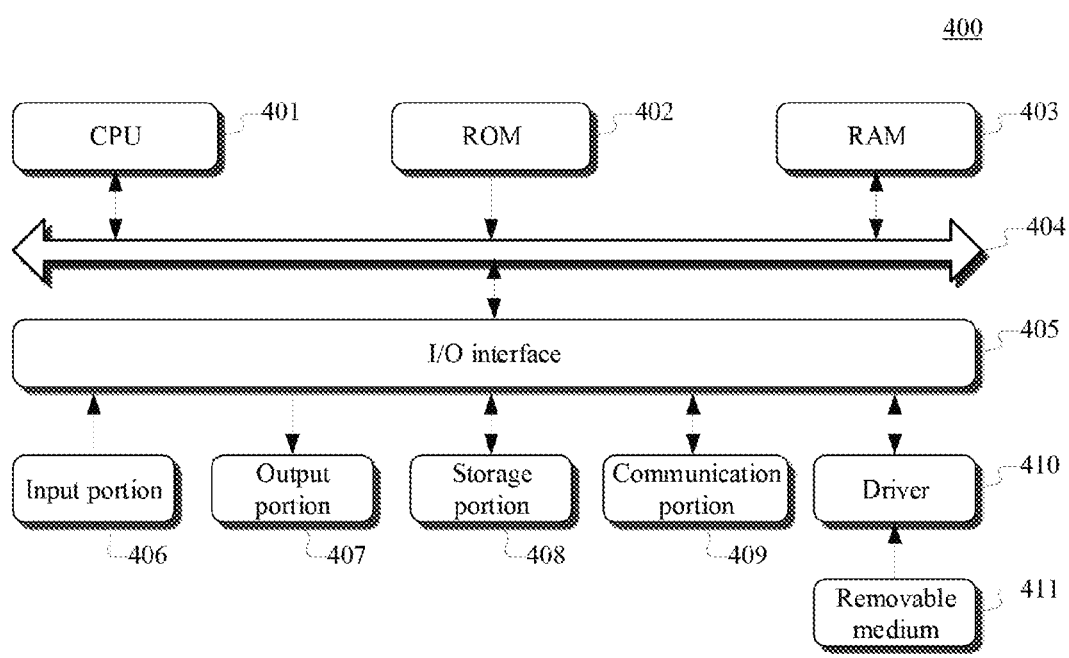
FIG. 4 is a schematic structural diagram of a computer system adapted to implement the apparatus for executing a distributed computing task according to the embodiments of the present disclosure.

Referring to FIG. 4, a schematic structural diagram of a computer system adapted to implement a distributed computing device of the embodiments of the present disclosure is shown.

As shown in FIG. 4, the computer system 400 includes a central processing unit (CPU) 401, which may execute various appropriate actions and processes in accordance with a program stored in a read-only memory (ROM) 402 or a program loaded into a random access memory (RAM) 403 from a storage portion 408. The RAM 403 also stores various programs and data required by operations of the system 400. The CPU 401, the ROM 402 and the RAM 403 are connected to each other through a bus 404. An input/output (I/O) interface 405 is also connected to the bus 404.

The following components are connected to the I/O interface 405: an input portion 406 including a keyboard, a mouse etc.; an output portion 407 including a cathode ray tube (CRT), a liquid crystal display device (LCD), a speaker etc.; a storage portion 408 including a hard disk and the like; and a communication portion 409 including a network interface card, such as a LAN card and a modem. The communication portion 409 performs communication processes via a network, such as the Internet. A driver 410 is also connected to the I/O interface 405 as required. A removable medium 411, such as a magnetic disk, an optical disk, a magneto-optical disk, and a semiconductor memory, may be installed on the driver 410, to facilitate the retrieval of a computer program from the removable medium 411, and the installation thereof on the storage portion 408 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 409, and/or may be installed from the removable media 411. The computer program, when executed by the central processing unit (CPU) 401, implements the above mentioned functionalities as defined by the methods of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an expression-parsing unit and an execution unit, where the names of these units do not in some cases constitute a limitation to such units themselves. For example, the expression-parsing unit may also be described as "a unit for parsing an expression of the distributed computing task."

In another aspect, the present disclosure further provides a non-volatile computer storage medium. The non-volatile computer storage medium may be the non-volatile computer storage medium included in the apparatus in the above described embodiments, or a stand-alone non-volatile computer storage medium not assembled into the apparatus. The non-volatile computer storage medium stores one or more programs. The one or more programs, when executed by a device, cause the device to: parsing an expression of the distributed computing task to obtain an operator keyword, the operator keyword comprising at least one of: a grouping operator keyword, an operation operator keyword, a traversal operator keyword, a value acquisition operator keyword, a key-value pair acquisition operator keyword, a file reading operator keyword, a memory reading operator keyword, a file writing operator keyword, and a memory writing operator keyword; and executing, by using an operator corresponding to the operator keyword, the distributed computing task based on an input parameter of the operator, the input parameter of the operator comprising at least one of: a distributively stored distributed dataset including at least one data element, and a distributively stored distributed key-value pair set including at least one key-value pair, a value of the key-value pair in the distributed key-value pair set being a distributed dataset or a distributed key-value pair set.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for executing a distributed computing task, the method comprising:

parsing an expression of the distributed computing task to obtain an operator keyword; and executing, by using an operator corresponding to the operator keyword, the distributed computing task based on an input parameter of the operator, the input parameter of the operator comprising a distributively stored distributed key-value pair set including at least one key-value pair, a value of the key-value pair in the distributed key-value pair set being a distributed dataset or a distributed key-value pair set, wherein the method is performed by at least one hardware processor, wherein the parsing an expression of the distributed computing task to obtain an operator keyword comprises:

parsing the expression of the distributed computing task to obtain a grouping operator keyword, a grouped distributed dataset keyword for representing a distributed dataset operated by a grouping operator corresponding to the grouping operator keyword, and a grouping condition keyword for representing a grouping basis for grouping the distributed dataset represented by the grouped distributed dataset keyword; and the executing, by using an operator corresponding to the operator keyword, the distributed computing task based on an input parameter of the operator, comprises:

forming a plurality of new key-value pairs by: dividing each of a plurality of numbers by a given number to acquire a remainder of the each number; determining, from the plurality of numbers, first numbers having a given first remainder and second numbers having a given second remainder; forming a first dataset including the first numbers and forming a second dataset including the second numbers; using the first dataset as a first value, using the second dataset as a second value, using the first remainder as a first key and using the second remainder as a second key; and forming a first new key-value pair by using the first key and the first value and forming a second new key-value pair by using the second key and the second value.

2. The method according to claim 1, wherein the parsing an expression of the distributed computing task to obtain an operator keyword comprises:

parsing the expression of the distributed computing task to obtain an operation operator keyword, an operated distributed dataset keyword for representing a distributed dataset operated by an operation operator corresponding to the operation operator keyword, and a return distributed dataset keyword for representing a distributed dataset returned after performing an operation corresponding to the operation operator keyword on the distributed dataset represented by the operated distributed dataset keyword; and the executing, by using an operator corresponding to the operator keyword, the distributed computing task based on an input parameter of the operator, comprises:

performing the operation corresponding to the operation operator keyword on the distributed dataset represented by the operated distributed dataset keyword and returning a new distributed dataset, and determining the new distributed dataset as the distributed dataset represented by the return distributed dataset keyword.

3. The method according to claim 1, wherein the parsing an expression of the distributed computing task to obtain an operator keyword comprises:

parsing the expression of the distributed computing task to obtain a traversal operator keyword, a traversed distributed key-value pair set keyword for representing a distributed key-value pair set operated by a traversal operator corresponding to the traversal operator keyword, and a traversed operator keyword for representing an operator operated by the traversal operator corresponding to the traversal operator keyword; and the executing, by using an operator corresponding to the operator keyword, the distributed computing task based on an input parameter of the operator, comprises:

performing an operation corresponding to the traversed operator keyword on a distributed dataset corresponding to a value in each key-value pair in the distributed key-value pair set represented by the traversed distributed key-value pair set keyword.

4. The method according to claim 1, wherein the parsing an expression of the distributed computing task to obtain an operator keyword comprises:

parsing the expression of the distributed computing task to obtain a value acquisition operator keyword, a value-supplying distributed key-value pair set keyword for representing a distributed key-value pair set operated by a value acquisition operator corresponding to the value acquisition operator keyword, and a value acquisition distributed dataset keyword for representing a distributed dataset returned after performing an operation corresponding to the value acquisition operator keyword on the distributed key-value pair set represented by the value-supplying distributed key-value pair set keyword; and the executing, by using an operator corresponding to the operator keyword, the distributed computing task based on an input parameter of the operator, comprises:

adding values in key-value pairs of the distributed key-value pair set represented by the value-supplying distributed key-value pair set keyword as data elements to the distributed dataset represented by the value acquisition distributed dataset keyword.

5. The method according to claim 1, wherein the parsing an expression of the distributed computing task to obtain an operator keyword comprises:

parsing the expression of the distributed computing task to obtain a file reading operator keyword, a file reading distributed dataset keyword for representing a distributed dataset operated by a file reading operator corresponding to the file reading operator keyword, and a file reading storage path for representing a file operated by the file reading operator; and the executing, by using an operator corresponding to the operator keyword, the distributed computing task based on an input parameter of the operator, comprises:

writing data in the file represented by the file reading storage path to the distributed dataset represented by the file reading distributed dataset keyword.

6. The method according to claim 1, wherein the parsing an expression of the distributed computing task to obtain an operator keyword comprises:

parsing the expression of the distributed computing task to obtain a memory reading operator keyword, a memory reading distributed dataset keyword for representing a distributed dataset operated by a memory reading operator, and a memory reading address keyword for representing a memory operated by the memory reading operator; and the executing, by using an operator corresponding to the operator keyword, the distributed computing task based on an input parameter of the operator, comprises:

writing data in the memory represented by the memory reading address keyword to the distributed dataset represented by the memory reading distributed dataset keyword.

7. The method according to claim 1, wherein the parsing an expression of the distributed computing task to obtain an operator keyword comprises:

parsing the expression of the distributed computing task to obtain a file writing operator keyword, a file writing distributed dataset keyword for representing a distributed dataset operated by a file writing operator, and a file writing storage path for representing a file operated by the file writing operator; and the executing, by using an operator corresponding to the operator keyword, the distributed computing task based on an input parameter of the operator, comprises:
writing data in the distributed dataset represented by the file writing distributed dataset keyword to the file represented by the file writing storage path.

8. The method according to claim 1, wherein the parsing an expression of the distributed computing task to obtain an operator keyword comprises:
parsing the expression of the distributed computing task to obtain a memory writing operator keyword, a memory writing distributed dataset keyword for representing a distributed dataset operated by the memory writing operator, and a memory writing address keyword for representing a memory operated by the memory writing operator; and
the executing, by using an operator corresponding to the operator keyword, the distributed computing task based on an input parameter of the operator, comprises:
writing data in the distributed dataset represented by the memory writing distributed dataset keyword to the memory represented by the memory writing address keyword.

9. An apparatus for executing a distributed computing task, the apparatus comprising:
at least one processor; and
a memory storing instructions, wherein the instructions when executed by the at least one processor, cause the at least one processor to perform operations, the operations comprising:
parsing an expression of the distributed computing task to obtain an operator keyword; and
executing, by using an operator corresponding to the operator keyword, the distributed computing task based on an input parameter of the operator, the input parameter of the operator comprising at least one of: a distributively stored distributed key-value pair set including at least one key-value pair, a value of the key-value pair in the distributed key-value pair set being a distributed dataset or a distributed key-value pair set,
wherein the parsing an expression of the distributed computing task to obtain an operator keyword comprises:
parsing the expression of the distributed computing task to obtain a grouping operator keyword, a grouped distributed dataset keyword for representing a distributed dataset operated by a grouping operator corresponding to the grouping operator keyword, and a grouping condition keyword for representing a grouping basis for grouping the distributed dataset represented by the grouped distributed dataset keyword; and
the executing, by using an operator corresponding to the operator keyword, the distributed computing task based on an input parameter of the operator, comprises:
forming a plurality of new key-value pairs by: dividing each of a plurality of numbers by a given number to acquire a remainder of the each number; determining, from the plurality of numbers, first numbers having a given first remainder and second numbers having a given second remainder; forming a first dataset including the first numbers and forming a second dataset including the second numbers; using the first dataset as a first value, using the second dataset as a second value, using the first remainder as a first key and using the second remainder as a second key; and forming a first new key-value pair by using the first key and the first value and forming a second new key-value pair by using the second key and the second value.

10. The apparatus according to claim 9, wherein the parsing an expression of the distributed computing task to obtain an operator keyword comprises:
parsing the expression of the distributed computing task to obtain an operation operator keyword, an operated distributed dataset keyword for representing a distributed dataset operated by an operation operator corresponding to the operation operator keyword, and a return distributed dataset keyword for representing a distributed dataset returned after performing an operation corresponding to the operation operator keyword on the distributed dataset represented by the operated distributed dataset keyword; and
the executing, by using an operator corresponding to the operator keyword, the distributed computing task based on an input parameter of the operator, comprises:
performing the operation corresponding to the operation operator keyword on the distributed dataset represented by the operated distributed dataset keyword and return a new distributed dataset, and determine the new distributed dataset as the distributed dataset represented by the return distributed dataset keyword.

11. The apparatus according to claim 9, wherein the parsing an expression of the distributed computing task to obtain an operator keyword comprises:
parsing the expression of the distributed computing task to obtain a traversal operator keyword, a traversed distributed key-value pair set keyword for representing a distributed key-value pair set operated by a traversal operator corresponding to the traversal operator keyword, and a traversed operator keyword for representing an operator operated by the traversal operator corresponding to the traversal operator keyword; and
the executing, by using an operator corresponding to the operator keyword, the distributed computing task based on an input parameter of the operator, comprises:
performing an operation corresponding to the traversed operator keyword on a distributed dataset corresponding to a value in each key-value pair in the distributed key-value pair set represented by the traversed distributed key-value pair set keyword.

12. The apparatus according to claim 9, wherein the parsing an expression of the distributed computing task to obtain an operator keyword comprises:
parsing the expression of the distributed computing task to obtain a value acquisition operator keyword, a value-supplying distributed key-value pair set keyword for representing a distributed key-value pair set operated by a value acquisition operator corresponding to the value acquisition operator keyword, and a value acquisition distributed dataset keyword for representing a distributed dataset returned after performing an operation corresponding to the value acquisition operator keyword on the distributed key-value pair set represented by the value-supplying distributed key-value pair set keyword; and
the executing, by using an operator corresponding to the operator keyword, the distributed computing task based on an input parameter of the operator, comprises:
adding values in key-value pairs of the distributed key-value pair set represented by the value-supplying distributed key-value pair set keyword as data elements to the distributed dataset represented by the value acquisition distributed dataset keyword.

13. The apparatus according to claim 9, wherein the parsing an expression of the distributed computing task to obtain an operator keyword comprises:

parsing the expression of the distributed computing task to obtain a file reading operator keyword, a file reading distributed dataset keyword for representing a distributed dataset operated by a file reading operator corresponding to the file reading operator keyword, and a file reading storage path for representing a file operated by the file reading operator; and the executing, by using an operator corresponding to the operator keyword, the distributed computing task based on an input parameter of the operator, comprises:

writing data in the file represented by the file reading storage path to the distributed dataset represented by the file reading distributed dataset keyword.

14. The apparatus according to claim 9, wherein the parsing an expression of the distributed computing task to obtain an operator keyword comprises:

parsing the expression of the distributed computing task to obtain a memory reading operator keyword, a memory reading distributed dataset keyword for representing a distributed dataset operated by a memory reading operator and a memory reading address keyword for representing a memory operated by the memory reading operator; and the executing, by using an operator corresponding to the operator keyword, the distributed computing task based on an input parameter of the operator, comprises:

writing data in the memory represented by the memory reading address keyword to the distributed dataset represented by the memory reading distributed dataset keyword.

15. The apparatus according to claim 9, wherein the parsing an expression of the distributed computing task to obtain an operator keyword comprises:

parsing the expression of the distributed computing task to obtain a file writing operator keyword, a file writing distributed dataset keyword for representing a distributed dataset operated by a file writing operator, and a file writing storage path for representing a file operated by the file writing operator; and the executing, by using an operator corresponding to the operator keyword, the distributed computing task based on an input parameter of the operator, comprises:

writing data in the distributed dataset represented by the file writing distributed dataset keyword to the file represented by the file writing storage path.

16. A non-transitory computer storage medium, storing computer readable instructions executable by a processor, the computer readable instructions, when executed by the processor, cause the processor to perform operations, the operations comprising:

parsing an expression of the distributed computing task to obtain an operator keyword; and executing, by using an operator corresponding to the operator keyword, the distributed computing task based on an input parameter of the operator, the input parameter of the operator comprising a distributively stored distributed key-value pair set including at least one key-value pair, a value of the key-value pair in the distributed key-value pair set being a distributed dataset or a distributed key-value pair set, wherein the parsing an expression of the distributed computing task to obtain an operator keyword comprises:

parsing the expression of the distributed computing task to obtain a grouping operator keyword, a grouped distributed dataset keyword for representing a distributed dataset operated by a grouping operator corresponding to the grouping operator keyword, and a grouping condition keyword for representing a grouping basis for grouping the distributed dataset represented by the grouped distributed dataset keyword; and the executing, by using an operator corresponding to the operator keyword, the distributed computing task based on an input parameter of the operator, comprises:

forming a plurality of new key-value pairs by: dividing each of a plurality of numbers by a given number to acquire a remainder of the each number; determining, from the plurality of numbers, first numbers having a given first remainder and second numbers having a given second remainder; forming a first dataset including the first numbers and forming a second dataset including the second numbers; using the first dataset as a first value, using the second dataset as a second value, using the first remainder as a first key and using the second remainder as a second key; and forming a first new key-value pair by using the first key and the first value and forming a second new key-value pair by using the second key and the second value.

17. The method according to claim 1, wherein the parsing an expression of the distributed computing task to obtain an operator keyword comprises:

parsing the expression of the distributed computing task to obtain a key-value pair acquisition operator keyword, a key-value pair supplying distributed key-value pair set keyword for representing a distributed key-value pair set operated by a key-value pair acquisition operator corresponding to the key-value pair acquisition operator keyword, and a key-value pair acquisition distributed dataset keyword for representing a distributed dataset returned after performing an operation corresponding to the key-value pair acquisition operator keyword on the distributed key-value pair set represented by the key-value pair supplying distributed key-value pair set keyword; and the executing, by using an operator corresponding to the operator keyword, the distributed computing task based on an input parameter of the operator, comprises:

forming a plurality of new key-value pairs by combining a given key of a given key-value pair with respective data elements of a value of the given key-value pair, wherein all keys of the new key-value pairs are identical to the given key, wherein the given key-value pair is in the distributed key-value pair set represented by the key-value pair supplying distributed key-value pair set keyword, and the value of the given key-value pair is a dataset consisting of all values of the new key-value pairs; and adding the new key-value pairs as data elements to the distributed dataset represented by the key-value pair acquisition distributed dataset keyword.

18. The method according to claim 17, wherein none of the keys of the new key-value pairs are different from each other.

19. The method according to claim 1, wherein the parsing an expression of the distributed computing task to obtain an operator keyword comprises:

parsing the expression of the distributed computing task to obtain a value acquisition operator keyword, a value-supplying distributed key-value pair set keyword for representing a distributed key-value pair set operated by a value acquisition operator corresponding to the value acquisition operator keyword, and a value acquisition distributed dataset keyword for representing a distributed dataset returned after performing an operation corresponding to the value acquisition operator keyword on the distributed key-value pair set represented by the value-supplying distributed key-value pair set keyword; and the executing, by using an operator corresponding to the operator keyword, the distributed computing task based on an input parameter of the operator, comprises:

acquiring values of a plurality of key-value pairs; and arranging the values of the plurality of key-value pairs in an ascending order; and adding the values in the ascending order as data elements to the distributed dataset represented by the key-value pair acquisition distributed dataset keyword.

\* \* \* \* \*